United States Patent
Tiberghien

(10) Patent No.: US 6,428,166 B2
(45) Date of Patent: Aug. 6, 2002

(54) EYEGLASSES HAVING WIRE TEMPLES

(75) Inventor: Hervé Tiberghien, Menton (FR)

(73) Assignee: Timon, Linas (FR)

( * ) Notice: Subject to any disclaimer, the term of this patent is extended or adjusted under 35 U.S.C. 154(b) by 0 days.

(21) Appl. No.: 09/904,648

(22) Filed: Jul. 13, 2001

(30) Foreign Application Priority Data

Jul. 17, 2000 (FR) .............................. 00 09295

(51) Int. Cl.⁷ .............................. G02C 5/22; G02C 1/02
(52) U.S. Cl. ...................... 351/153; 351/110; 16/228
(58) Field of Search ...................... 351/110, 140, 351/153; 16/228

(56) References Cited

U.S. PATENT DOCUMENTS

| 943,085 A | 12/1909 | Lawrence | 351/110 |
| 5,450,141 A | * 9/1995 | Kobayashi | 351/110 |
| 5,781,270 A | * 7/1998 | Fortini | 351/110 |
| 5,984,472 A | * 11/1999 | Kobayashi | 351/153 |

FOREIGN PATENT DOCUMENTS

| EP | 0426006 | 5/1991 |
| EP | 0805369 | 11/1997 |
| FR | 2751431 | 1/1998 |
| WO | 9208158 | 5/1992 |
| WO | 9633438 | 10/1996 |

* cited by examiner

*Primary Examiner*—Huy Mai
(74) *Attorney, Agent, or Firm*—McCormick, Paulding & Huber LLP

(57) ABSTRACT

Eyeglasses have a vertical midplane of symmetry and comprise a front optical portion and two wire temples each associated with a respective side zone of the front optical portion. Each temple has a hinge end shaped as an eyelet lying in a vertical plane intersecting a general longitudinal direction of the temple. A hinge element is fixed on an inside surface of the corresponding side zone to receive the eyelet to pivot about an axis that is substantially normal to said inside surface, between a deployed position in which the temple is substantially perpendicular to the front optical portion, and a folded position in which the temple is substantially parallel to the front optical portion.

8 Claims, 2 Drawing Sheets

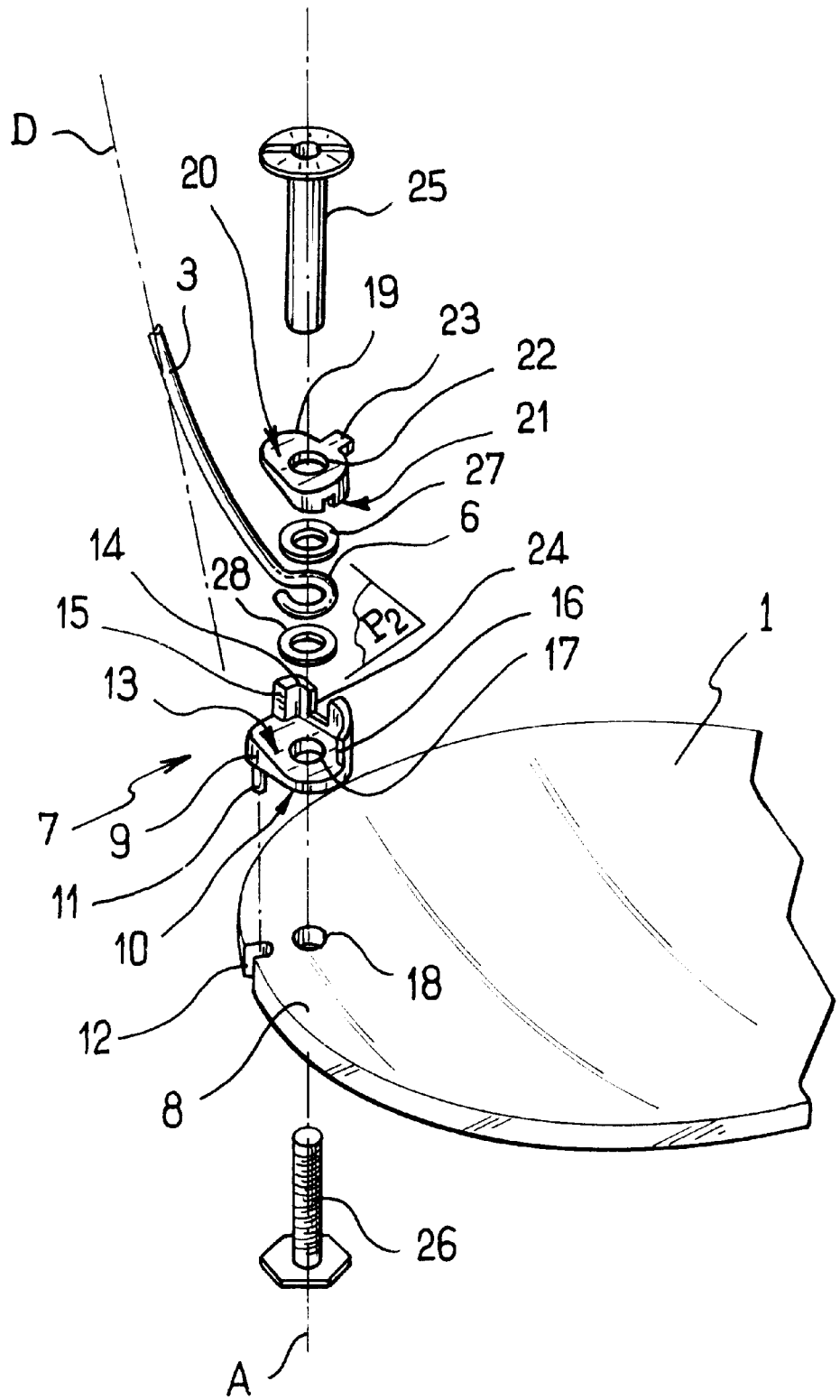
FIG_1

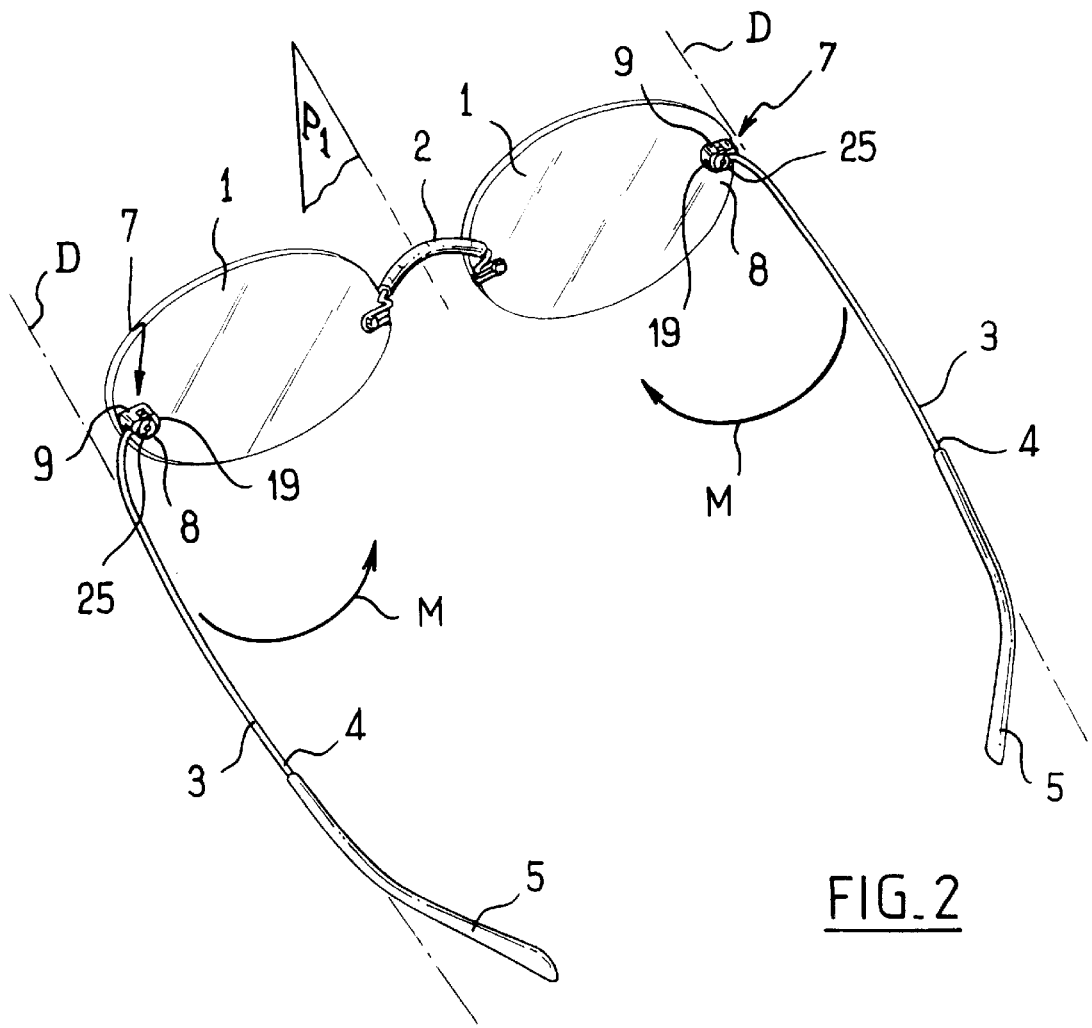
FIG_2
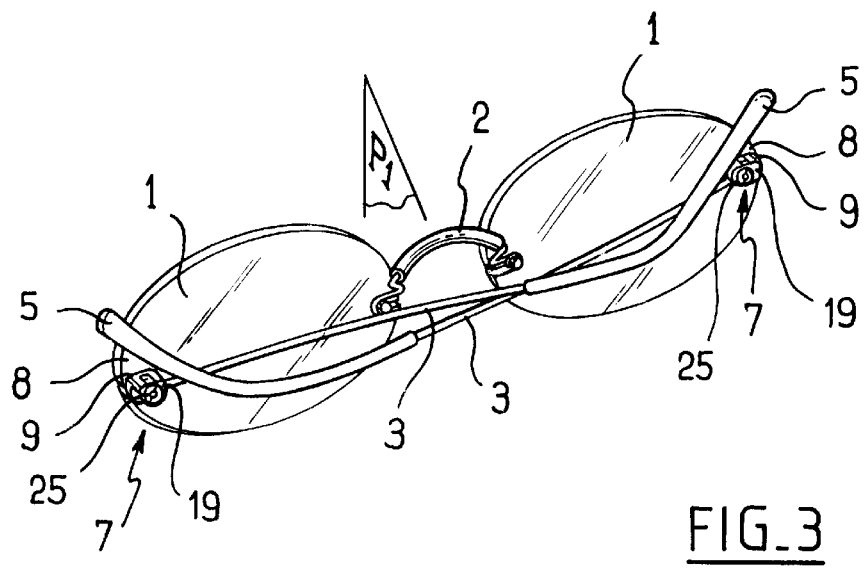
FIG_3

EYEGLASSES HAVING WIRE TEMPLES

The present invention relates to eyeglasses having wire type temples.

BACKGROUND OF THE INVENTION

Eyeglasses are known, in particular from document U.S. Pat. No. 943,085, that comprise two correcting lenses connected to each other by means of a bridge, and two wire temples each associated with a side zone of a respective one of the lenses. Each temple has one end fixed to a hinge about a vertical axis and is secured to one end of a support rod whose opposite end is fixed to said side portion of the corresponding lens, normally thereto. The temples can thus be moved between a deployed position in which they extend substantially perpendicularly to the lenses and a folded position in which they lie substantially parallel to the lenses. Such eyeglasses are very light in weight and benefit from remarkably pleasing external appearance which is conferred on them in particular by the fineness of the frame. Nevertheless, in the folded position, those eyeglasses are relatively bulky with projecting portions, including the hinges. Each hinge constitutes a prominent portion projecting from the temple that runs the risk of catching on fibers in the cloth of a jacket or on the stitches of knitwear when the eyeglasses are placed in a pocket of such a garment. Furthermore, there is the risk that some users will find that the hinge spoils the impression of fineness given off by the frame of the eyeglasses.

It would therefore be advantageous to have eyeglasses with wire temples hinged by means of hinges that are of dimensions that are small relative to the temples and that make it possible to obtain a folded position that is compact.

For the technological background of wire type frames, reference can also be made to the following documents: WO-A-96/33438, EP-A-0 805 369, and WO-A-92/08158.

Eyeglasses exist having temple hinges that are integrated in the frame.

Thus, eyeglasses are known, in particular from document EP-A-0 426 006, having lenses secured to a frame comprising firstly a lens-receiving portion and secondly temples formed by cylindrical rods connected to the lens-receiving portion via angled portions. Each angled portion has one end secured to the lens-receiving portion and an opposite end with an end face forming an angle relative to the plane containing the lens-receiving portion in order to co-operate with an end face at one end of the temple, which face forms an angle with the general longitudinal direction of the temple. The temple is connected to the angled portion by means of a screw inserted into the above-mentioned ends of the temple and of the angled portion perpendicularly to the above-mentioned faces so that the temple pivots on a conical path about the axis of the screw, between a deployed position in which the temple is perpendicular to the lens-receiving portion and a folded position in which the temple is parallel to the lens-receiving portion. In that case, the hinge is totally received in the temple and in the angled portion.

However, that assumes that the temples and the angled portions are of section that is relatively large, and much greater than the section of wire temples, such that that mounting is inapplicable to wire frame eyeglasses.

An analogous approach is illustrated in document FR-A-2 751 431.

SUMMARY OF THE INVENTION

An object of the invention is to propose wire frame eyeglasses presenting advantageously analogous to those of eyeglasses having integrated hinges.

To achieve this object, the invention provides eyeglasses having a vertical midplane of symmetry and comprising a front optical portion and two wire temples each associated on a respective side of said plane of symmetry with a corresponding side zone of the front optical portion, each temple having a hinge end shaped into an eyelet lying in a vertical plane intersecting a general longitudinal direction of the temple, and a hinge element being fixed on an inside surface of the corresponding side zone to receive the eyelet to pivot about an axis that is substantially normal to said inside surface between a deployed position of the temple which is then substantially perpendicular to the front optical portion and a folded position of the temple which is then substantially parallel to the front optical portion.

Thus, the hinge element is adjacent to the front optical portion and can be made as a compact structure which does not project sideways from the front optical portion or to the temples. The hinge element is also not very visible.

Preferably, the branches are curved.

The temples can then be arranged so as to extend closer to the front optical portion when in the folded position.

Advantageously, the hinge element is generally cylindrical in shape and includes a slot for guiding the eyelet and extending over about 180°.

As a result, the hinge element is simple and compact in structure. Provision can also be made to interpose a washer between the eyelet and each facing face of the slot, so as to avoid premature wear of the faces of the slot.

Preferably, the above-mentioned slot is helical.

This makes it possible, in particular, to limit the risk of friction between the temples and the front optical portion when folding said temples. In addition, this characteristic makes it easier to apply the invention to eyeglasses having a front optical portion that is plane.

In a particular embodiment, the hinge element comprises a base having a bearing face bearing against said side zone and provided with a projecting stud that is received in a notch formed in an edge of the side zone, and a cover having a face facing a face of the base opposite from the bearing face so as to define an eyelet guide slot.

The hinge element is then simple in structure making the temples easy and quick to mount.

In this embodiment, the cover preferably has a side projecting stud received in a notch of the base, and in addition the base and the cover are united by a fastener passing through the front optical portion, the eyelet, and the hinge element.

BRIEF DESCRIPTION OF THE DRAWINGS

Other characteristics and advantages of the invention will appear on reading the following description of a particular, non-limiting embodiment of the invention.

Reference is made to the accompanying drawings, in which:

FIG. 1 is a fragmentary exploded perspective view of a hinge for connecting a temple to one of the lenses of a pair of eyeglasses of the invention;

FIG. 2 is a rear view in perspective of the pair of eyeglasses in the deployed configuration; and FIG. 3 is a view analogous to FIG. 2, showing the pair of eyeglasses in the folded configuration.

DETAILED DESCRIPTION OF THE PREFERRED EMBODIMENT

With reference to the figures, eyeglasses of the invention comprises a front optical portion, in this case constituted by two lenses 1 interconnected by a bridge 2 and associated with two wire temples 3 each mounted to a respective lens 1 opposite from the other and on respective sides of a vertical midplane of symmetry reference P1.

Although the front optical portion is constituted in this case by two lenses, it could comprise a single piece with a cutout for the nose of the user, thereby forming a mask. In which case the bridge would be formed by said cutout. Furthermore, in a variant, provision could be made to receive the lenses in a frame. The term "lenses" covers both "mineral" lenses made of glass and "organic" lenses made of a plastics material such as polymethacrylate. Similarly, the lenses can be correcting lenses or filtering lenses of the kind found in sunglasses.

Each temple 3 is constituted in this case by a curved titanium wire having one end 4 that is at a slight angle and covered in a sheath 5 for coming into contact with one of the ears of the user, and an opposite end that is shaped to form an eyelet 6 lying in a plane P2 that forms an angle with a general longitudinal direction D of the temple 3. Naturally, the temples 3 could be made out of some other metal, such as stainless steel.

The eyelet 6 of each temple 3 is connected to a hinge element given overall reference 7 and fixed on a side zone 8 of the inside surface of a lens 1 remote from the bridge 2.

Each hinge element 7 comprises a base 9 having a face 10 for bearing against said side zone 8, which face is provided with a projecting anti-rotation stud 11 received in a notch 12 formed in an edge of the side zone 8, and an opposite face 13 which slopes relative to the bearing face 10 and forms a rubbing face for the eyelet 6 parallel to the plane P2. A wall 14 projects from the face 13 and presents opposite edges 15, 16 at 180° to each other. The base 9 has a hole 17 on an axis A perpendicular to the bearing face 10 passing through the base 9 in register with a hole 18 formed in the side zone 8 on the axis A and substantially normal thereto.

A cover 19 is mounted on the base 9. The cover 19 possesses a face 20 parallel to the bearing face 10, and an opposite face 21 that slopes relative to the face 20 so as to form a rubbing face for the eyelet 6 parallel to the plane P2. The cover 19 is mounted on the base 9 so that the face 21 faces the face 13 of the base 9 and is parallel therewith, thereby defining a helical slot for guiding the eyelet 6. Provision is also made here to interpose respective washers 27, 28 between the eyelet 6 and each of the facing faces of the slot. It is possible to use simple flat washers of stainless steel that are few tenths of a millimeter (mm) thick. These washers 27, 28 prevent premature wear of the faces 13, 21 of the helical slot due to friction against the eyelet, particularly when the frame is made of titanium having a highly abrasive surface: such wear would lead to a play effect that would be highly undesirable for the temple concerned.

The cover 19 has a hole 22 on the same axis as the hole 17, and a projecting side anti-rotation stud 23 received in a notch 24 of the base 9.

The base 9 and the cover 19 are united by a nut-and-bolt fastener passing through the hole 22, the eyelet 6, the hole 17, and the hole 18. The fastener thus serves to fix the hinge element 7 to the lens 1 and to hold the eyelet 6 between the base 9 and the cover 19. The fastener comprises a nut 25 having a shoulder and a tapped bore, co-operating with a screw 26 having a hexagonal head.

It will be understood that the fastener also constitutes a pivot pin about which the temple 3 pivots between a deployed position (shown in FIG. 2) in which the temple 3 comes into abutment against the edge 15 and is substantially perpendicular to the front optical portion, and a folded position (shown in FIG. 3) in which the temple 3 is in abutment against the edge 16 and is substantially parallel to the front optical portion. The movement whereby the temples pass from the deployed position to the folded position is represented in FIG. 2 by arrows M. During this movement, or the reverse movement, the hinge element 7 forms a block that is rigidly secured to the associated optical portion and there is no relative rotation between them because of the anti-rotation studs 11, 23.

The combination of the curvature of the temple 3 and the helical slot makes it possible to bring the temples 3 closer to the lenses 1 in the folded position without the temples touching the lenses 1 other than via their earpiece sheaths 5. This prevents the temples 3 from rubbing against and scratching the inside surfaces of the lenses 1 as they move between the deployed position and the folded position.

Naturally, the invention is not limited to the embodiment described and various embodiments can be applied thereto without going beyond the ambit of the invention as defined by the claims.

What is claimed is:

1. Eyeglasses having a vertical midplane of symmetry and comprising a front optical portion and two wire temples each associated on a respective side of said plane of symmetry with a corresponding side zone of the front optical portion, wherein each temple has a hinge end shaped into an eyelet lying in a vertical plane intersecting a general longitudinal direction of the temple, and wherein a hinge element is fixed on an inside surface of the corresponding side zone to receive the eyelet to pivot about an axis that is substantially normal to said inside surface between a deployed position of the temple which is then substantially perpendicular to the front optical portion and a folded position of the temple which is then substantially parallel to the front optical portion.

2. Eyeglasses according to claim 1, wherein the temples are curved.

3. Eyeglasses according to claim 1, wherein the hinge element is generally cylindrical in shape and includes a slot for guiding the eyelet and extending over about 180°.

4. Eyeglasses according to claim 3, wherein the slot is helical.

5. Eyeglasses according to claim 3, wherein a washer is interposed between the eyelet and each facing face of the slot.

6. Eyeglasses according to claim 1, wherein the hinge element comprises a base having a bearing face bearing against said side zone and provided with a projecting stud that is received in a notch formed in an edge of the side zone, and a cover having a face facing a face of the base opposite from the bearing face so as to define an eyelet guide slot.

7. Eyeglasses according to claim 6, wherein the cover has a side projecting stud received in a notch of the base.

8. Eyeglasses according to claim 6, wherein the base and the cover are united by a fastener passing through the front optical portion, the eyelet, and the hinge element.

* * * * *